United States Patent [19]

Ishizawa

[11] Patent Number: 4,514,768
[45] Date of Patent: Apr. 30, 1985

[54] IMAGE FORMING APPARATUS

[75] Inventor: Toshimichi Ishizawa, Kawasaki, Japan

[73] Assignee: Tokyo Shibaura Denki Kabushiki Kaisha, Kawasaki, Japan

[21] Appl. No.: 535,160

[22] Filed: Sep. 23, 1983

[30] Foreign Application Priority Data

Sep. 29, 1982 [JP] Japan .................................. 57-170352

[51] Int. Cl.³ .............................................. H01N 1/00
[52] U.S. Cl. ...................................... 358/296; 358/298
[58] Field of Search .......................... 358/296, 298–300

[56] References Cited

U.S. PATENT DOCUMENTS 3,790,703  2/1974  Carley .................................. 358/296
3,830,975  8/1974  Potter .............................. 358/296 X
4,026,642  5/1977  Tanaka et al. .................... 358/300 X Primary Examiner—Thomas H. Tarcza
Attorney, Agent, or Firm—Cushman, Darby & Cushman

[57] ABSTRACT

An image forming apparatus is disclosed, which comprises a scanner for producing image information on a document by optically scanning the document, a keyboard for specifying various type face patterns of characters, numerals, symbols, etc., and a character generator for providing type face patterns specified by the keyboard. The document image information is dot printed on a paper sheet by using all of the heating elements of a thermal head, while the type face pattern data is dot printed on a paper sheet by driving every other one of the heating elements, i.e., it is dot printed with one half the dot number of the document image information.

7 Claims, 8 Drawing Figures

IMAGE FORMING APPARATUS

BACKGROUND OF THE INVENTION

This invention relates to a pattern forming apparatus and, more particularly, to an image forming apparatus, which can selectively print document image information and type face patterns, e.g., characters, numerals, and symbols.

Recently, electrographic apparatuses employing wire dot printers, thermal dot printers and laser dot printers have come into general use. Such electrophotographic apparatuses use an optical scanner for scanning a document to produce image information relating thereto. The image information so produced is converted into digital image signals, and a dot printer is driven according to the digital image signals to print the document pattern as a dot print configuration. In such a dot printer, the higher the dot density, the more faithfully the document pattern can be reproduced. The dot printer can also print character patterns generated from a character generator. In an electrographic apparatus which can print out both document image information from the scanner and character patterns from the character generator, as described above, the dot pattern is commonly used to print out the document image information and character patterns. In this case, the dot density of the dot pattern is set at high value so that image information can be faithfully reproduced. This means that a large number of bits are required in constructing a character pattern; and, also, that a large capacity memory is needed to store the character patterns. If the bit number of the character pattern and hence the dot density, is reduced, the reliable reproduction of image information is precluded.

SUMMARY OF THE INVENTION

An object of the invention is to provide an image forming apparatus, which can faithfully reproduce document image information pertaining to a document and reduce the number of character pattern bits.

According to the invention, an image forming apparatus is provided, which apparatus comprises a scanner for producing document image information and a character generator for providing character patterns, and in which character pattern data is constructed by bits less than the document image information, document image information being supplied as such to the dot printer for printing, while character pattern data is supplied at least for every other dot, to the dot printer for printing the character patterns at coarser dots (lower density) than the document image information.

DETAILED DESCRIPTION OF THE PREFERRED EMBODIMENT

Figure 1:
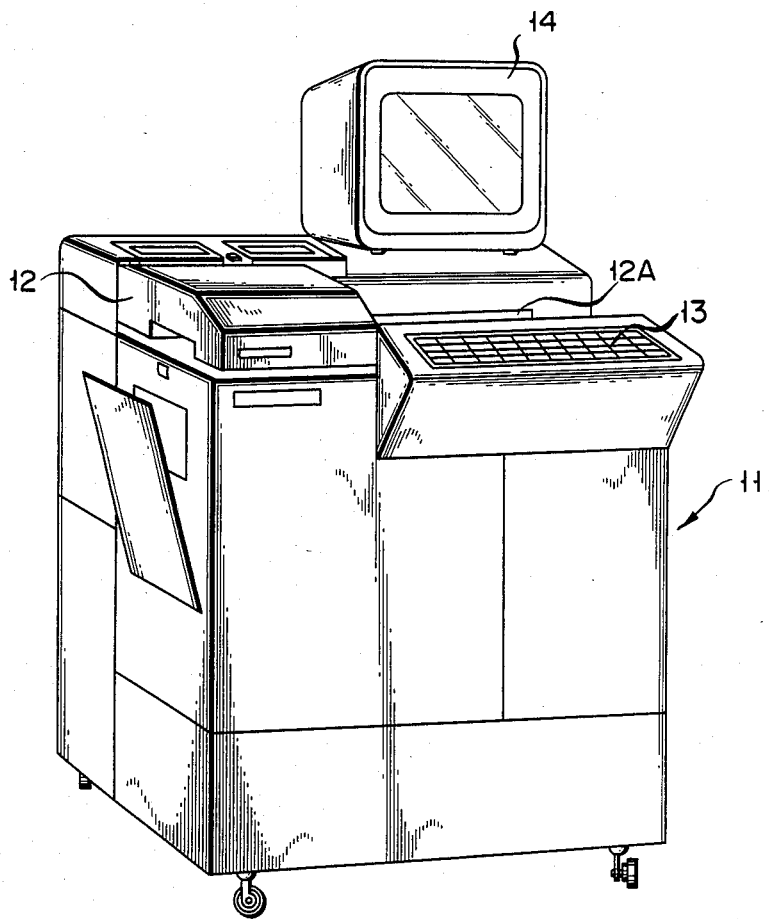
FIG. 1 is a perspective view of an image forming apparatus, e.g., an electrographic apparatus, as an embodiment of the invention.
Figure 2:
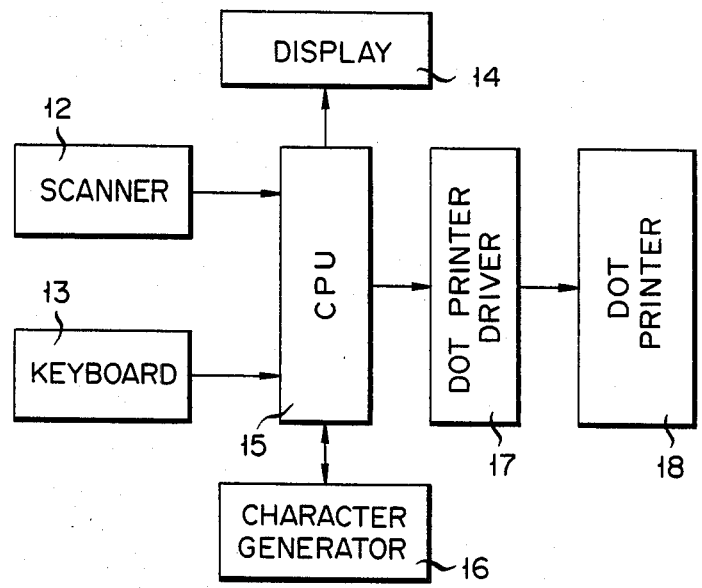
FIG. 2 is a block diagram of an essential part of the electrophotographic apparatus.

In FIG. 1, an electrophotographic apparatus 11 which serves as an image forming apparatus is shown. The illustrated electrophotographic apparatus 11 has an optical scanner 12, a keyboard 13 and a CRT display 14, all of which are provided at the top of the apparatus. As shown in FIG. 2, the scanner 12, keyboard 13 and display 14 are connected to the central processor unit (CPU) 15. A character generator 16 is further connected to the CPU 15. This character generator 16 includes a memory, in which character pattern data on characters, numerals, symbols, etc., is stored.

The CPU 15 is coupled to a dot printer 18, through a dot printer driver 17.

Figure 3:
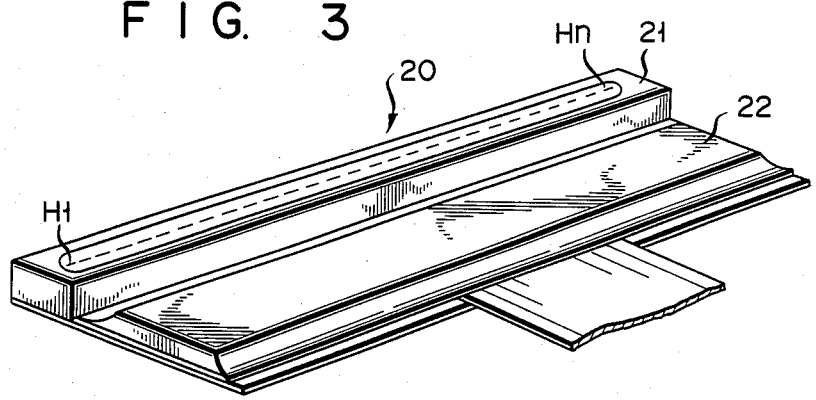
FIG. 3 is a schematic view of a dot printer using a thermal head.

As shown in FIG. 3, the dot printer 18 consists of a thermal head 20. The thermal head 20 includes a heater section 21, which section has a plurality of, e.g., 3,456 heating elements H1 to Hn arranged in a row at a uniform interval (e.g., 16 elements per mm), and a driver section 22 for driving the heater section 21.

Figure 4:
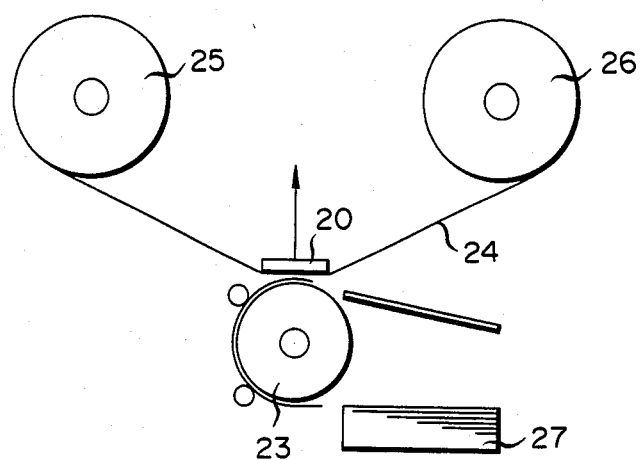
FIG. 4 is a perspective view of the thermal head shown in FIG. 3.

As shown in FIG. 4, the thermal head 20 faces a rotary drum 23. An ink ribbon 24 is passed between the thermal head 20 and rotary drum 23. This ribbon 24 is paid off an ink ribbon feeding reel 25 and taken up on an ink ribbon take-up reel 26. A paper cassette 27 is disposed in the vicinity of a lower portion of the rotary drum 23.

Figure 5:
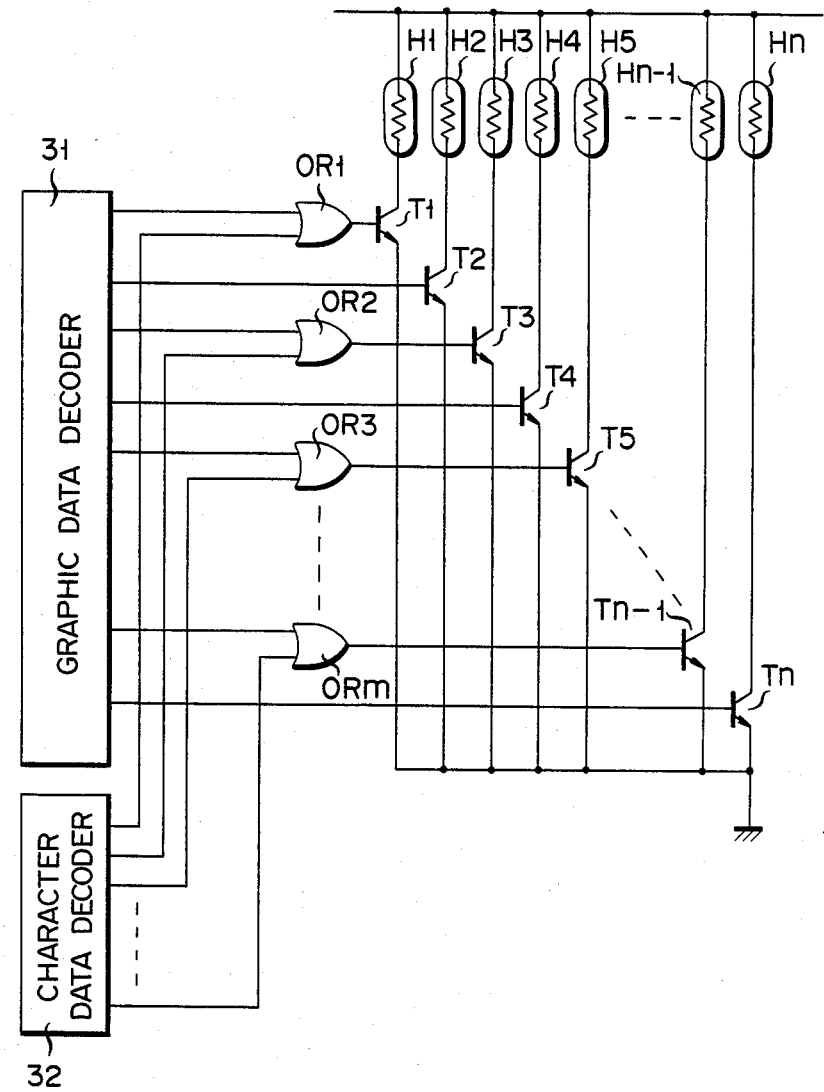
FIG. 5 is a circuit diagram of the electrical circuit of the thermal head dot printer according to the invention.

As shown in FIG. 5, the drive section 22 of the thermal head 20 has a graphic data decoder 31 and a character data decoder 32. The graphic data detector 31 has image information on the scanner 12 converted into signals suitable for driving the heating elements H1 to Hn. It also has output terminals corresponding to the respective heating elements. The character data decoder 32 converts character pattern data of, e.g. 32×32 bits into signals suited for driving the heating elements. Of the output terminals of the graphic data decoder 31, the odd number order terminals, for instance, are each connected to one of two input terminals of each of OR gates OR1 to ORm. The output terminals of the character data decoder 32 are each connected to the other input terminal of each of the OR gates OR1 to ORm. The heating elements H1 to Hn of the heater section 21 are grounded through the collector-emitter path of respective switching transistors T1 to Tn. The output terminals of the OR gates OR1 to ORm are connected to the base of the respective odd order number transistors T1, T3, T5, ..., Tn−1. The even order number output terminals of the graphic data decoder 31 are connected to the base of the respective even order number transistors T2, T4, ..., Tn.

In operation, when a document is inserted from a document guide table 12A into the scanner 12 and a start switch provided on the keyboard 13 is depressed, the scanner 12 is caused to scan the document and feed image information corresponding to the scanned document pattern to the CPU 15. The CPU 15 transfers the image information to the graphic data decoder 31 shown in FIG. 5. The graphic data decoder 31 converts the input image information into 3,456 bit signals. These bit signals are fed to the transistors T1 to Tn either directly or through the OR gates OR1 to ORm. The transistors T1 to Tn are selectively turned on according to the bit signals, i.e., according to the image information, and heating elements corresponding to the turned-on transistors are energized. If a paper sheet P fed from the paper cassette 27 to the rotary drum 23 is held urged by the thermal head 20, against the ink ribbon 14, ink on the ink ribbon 24 is transferred in dots onto the paper sheet P, according to the energized heating elements. An image for one scanning line is thus formed on the paper sheet P. In this way, ink is transferred in dots for successive scanning lines onto the paper sheet P, whereby the document pattern is formed thereon. Since ink representing the document pattern is transferred onto the paper sheet at a dot density of 16 dots per mm, the document pattern can be copied with a high resolution, and very high fidelity of copying can be obtained.

When a character is specified by the keyboard 13, the CPU 15 reads out a code corresponding to the specified character from the internal memory. The internal memory in the character generator 16 is addressed by this code. In the internal memory in the character generator 16, a number of pattern data with a 32-by-32-bit structure for various characters, numerals, symbols, etc., are stored in respective addresses. These addresses are retrieved, and pattern data is read out from an address corresponding to the code. The pattern data read out from the character generator 16, i.e., character pattern data, is stored in the internal memory of the CPU 15. When a succeeding character is specified by the keyboard 13, the corresponding pattern data is similarly read out from the character generator 16 and stored in the internal memory of the CPU 15. When character pattern data for one line is stored in the internal memory of the CPU 15, it is transferred to the character data decoder 32. The character data decoder 32 converts the transferred character pattern data for one line into signals of 1,728 bits, for one line. The bit signals for 1,728 bits provided from the character data decoder 32 are fed to the base of the odd order number transistors T1 to Tn−1, through the OR gates OR1 to ORm. The transistors are thus selectively turned on, according to the supplied bit signals, so that the corresponding heating elements are energized. Dots of ink from the ink ribbon 24 are transferred onto a paper sheet by heat generated from the energized heating elements. The transfer density, i.e., the dot density, in this case is 8 dots per mm, which is one half the dot density in the transfer of graphic data, i.e., in the transfer of document image information.

One line of characters is formed on the paper sheet upon the transfer of 32 successive lines of ink dots. When the next line of characters is input from the keyboard 13, this line is similarly printed out on the paper sheet. Successive lines of characters can thus be printed on the paper sheet.

The character pattern data is printed more coarsely than the graphic data (i.e., document image information), since the dot density of the character patterns is one half the dot density of the graphic patterns. However, since the character patterns are type face patterns, they can be sufficiently recognized, even though their dot density is somewhat coarse. By reducing the dot density of the character pattern, the bit number thereof can be reduced, to permit reduction of the memory capacity of the memory for storing the character pattern data. In addition, by reducing the dot number, the speed of printing character pattern data can be increased.

Figure 6:
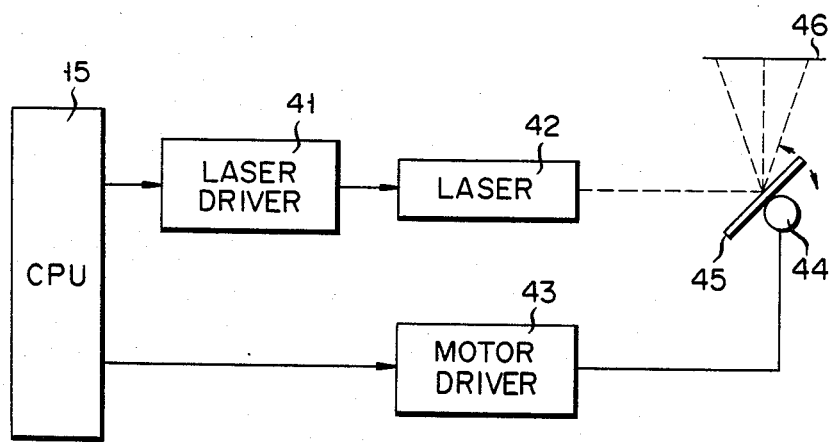
FIG. 6 is a block diagram of a laser dot printer used in a different embodiment of the image forming apparatus according to the invention.

FIG. 6 shows a different embodiment of the invention, which employs a laser printer. In this instance, a CPU 15 is coupled to a laser 42 through a laser driver 41, and is also coupled to a mirror driving motor 44, through a motor driver 43. The mirror driving motor 44 can drive a rotary mirror 45. The rotary mirror 45 serves to direct laser light emitted from the laser 42 to an illuminated object 46.

In operation, when document image information (i.e., graphic pattern data) is fed to the CPU 15, the CPU 15 supplies a bit signal, at a predetermined frequency corresponding to the input image information, to the laser driver 41, while also causing the motor driver 43 to rotate the mirror driving motor 44 at a constant speed. When the laser 42 is driven by the laser driver 41 at the predetermined frequency, it intermittently generates laser light according to the bit signal corresponding to the image information. The laser light is incident on the rotary mirror 45, and the object 46 is scanned by the laser light with the rotation of the mirror 45. A dot image for one line corresponding to the image information is thus formed on the object 46. The dot density in this case is set to 16 dots per mm as in the case of the thermal dot printer described above. The document pattern is copied on the object 46 with line scanning for successive lines.

When character data is input from the keyboard 13, corresponding character pattern data is read out from the character generator 16. The CPU 15 supplies the bit signal corresponding to the character pattern data to the laser driver 41 at the same frequency as in the case of the graphic pattern data. The laser 42 is driven by the laser driver 41 to intermittently generate laser light in correspondence to the character pattern data. At this time, the CPU 15 controls the motor driver 43, to rotate the mirror driving motor 44 at double the speed as in the case of graphic data printing. The mirror 45 is thus rotated at double the speed as in the case of graphic data printing. Laser light printing of characters on the object 46 can thus be obtained at 8 dots per mm, i.e., with one half the dot density, in the case of graphic data printing.

As has been shown, where a laser printer is used, as in the preceding embodiment, the scanning can be done at different speeds for document image information and character pattern data, to permit copying of the document image information with high resolution, while permitting the printing of character pattern data at high speed.

Figure 7:
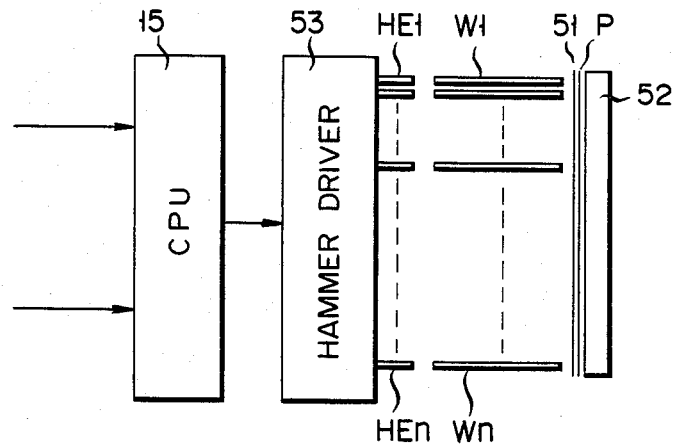
FIG. 7 is a schematic representation of a wire dot printer used in a further embodiment of the image forming apparatus according to the invention.

FIG. 7 shows a further embodiment of the invention, which employs a wire dot printer. In this instance, a plurality of wires W1 to Wn are arranged parallel to one another and movable in their longitudinal directions. On end of each of the wires W1 to Wn faces an ink ribbon 51. A paper sheet P is interposed between the ink ribbon 51 and a base 52. The other ends of the individual wires W1 to Wn face respective hammer elements HE1 to HEn. The hammer elements HE1 to HEn are independently driven by respective drive elements, e.g., solenoid elements, of a hammer driver 53. The circuit of the manner driver has a construction similar to that of the thermal head printer shown in FIG. 5. In this case, the solenoid elements replace the heating elements H1 to Hn.

In operation, when document image information is supplied to the CPU 15, the hammer driver 52 selectively drives the hammer elements HE1 to HEn according to the document image information. The wires W1 to Wn are selectively operated by the selectively driven hammer elements HE1 to HEn to effect the transfer of the ink of the ink ribbon 51 to the paper sheet P. The document image information can thus be dot printed on the paper sheet P with high density.

When character pattern data is supplied to the CPU 15, the odd order number hammer elements HE1, HE3, ..., HEn−1 are selectively driven according to the character pattern data. The character pattern data is thus printed on the paper sheet P at a lower dot density than in the case of document image information printing. The speed of character data printing is higher than that of the document image information printing, since the dot number of one line is smaller in the former case than in the latter.

Figure 8:
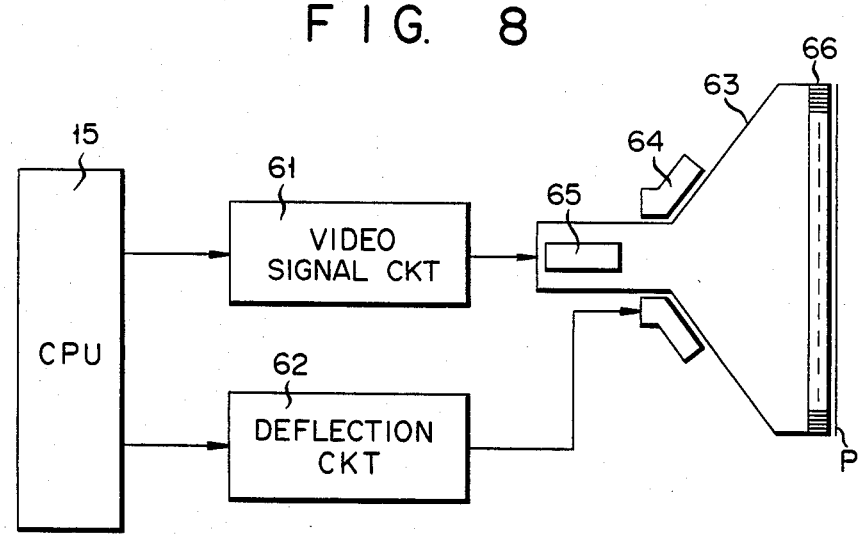
FIG. 8 is a schematic representation of a linear CRT dot printer used in a still further embodiment of the image forming apparatus according to the invention.

FIG. 8 shows a still further embodiment of the invention, which is applied to a CRT display. A CPU 15 is connected to a video signal circuit 61 and a deflection circuit 62. The output terminal of the video signal circuit 61 is connected to a linear scan cathode ray tube 63. The deflection circuit 62 is connected to the yoke coil 64 of a yoke coil 63.

In operation, when document image information is supplied from the CPU 15 to the video signal circuit 61, the video signal circuit 61 feeds a video signal corresponding to the document image information to the CRT 63. The CPU 15 also supplies a sync signal at a predetermined frequency to the deflection circuit 62. The deflection circuit 62 feeds a deflection signal (sawtooth signal), which is synchronized with the sync signal, to the yoke coil 64. An electron beam emitted from the electron gun 65 is deflected according to the deflection signal. The intensity of the electron beam is varied according to the video signal, i.e., according to the document image information, and this varying electron beam intensity is detected by a detecting surface 66. A plurality of sensor probes are provided on the detecting surface 66, which probe can form a dot pattern representing document image information on a sensitive sheet P, for instance.

When the CPU 15 transfers character pattern data to the video signal circuit 61, it supplies a sync signal to the deflection circuit 42 at double the frequency as in the case of document image information printing. The electron beam modulated according to the character pattern video signal is thus deflected at double the speed as in the case of the electron beam modulated by the document image information video signal. The character pattern information is thus dot-printed on the sensitive sheet P at double the speed as in the case of document image information printing.

As has been described in the foregoing, according to the invention, document image information obtained from the scanner can be dot-printed with high dot density, while type face information on characters and the like, which are provided from the keyboard, etc., can be dot-printed with low dot density. Thus, a memory having a small capacity can be used to store face type information for characters or the like, while face type information can be printed at high speed.

In the above embodiments, the document image information and type face information can be easily synthesized for printing by means of OR gates. In the embodiment of FIG. 8, a portion of the synthesis can be known since both document image information and type face information is displayed on the display 14.

In the above embodiments, the character pattern information was made coarser than the document pattern information. Where color image information is treated as document image information, however, image information for each primary color may be made coarser than character pattern information. In the case of color copying, the copy consists of color dot patterns of individual primary colors, and the dot density of the individual primary color dot patterns is coarse. However, one can discriminate different colors sufficiently, even if the dot density is comparatively coarse. The dot density of the color dot copy consisting of individual primary color dot patterns, however, is higher than the dot density of the character pattern data.

In the above embodiments, the ratio of the dot density of document image information and character pattern data is set at 2:1, though it can be changed to any desired ratio. Further, the keyboard, which serves as means for specifying character pattern data, may be replaced on a magnetic pen, a floppy disc device and a magnetic tape device.

What is claimed is:

1. An image forming apparatus comprising:
   means for picking up document image information from a document through photoelectric conversion;
   memory means in which pattern data corresponding to a plurality of different type face patterns are stored;
   pattern data specifying means for specifying pattern data corresponding to at least one type face pattern stored in said memory means; and
   means for reproducing document image information and pattern data with different dot densities, respectively.

2. The image forming apparatus according to claim 1, wherein said pick-up means is scanning means for picking up document image information by optically scanning the document.

3. The image forming apparatus according to claim 1, wherein said reproducing means includes means for converting document image information into a first bit signal of a predetermined bit density and converting pattern data into a second bit signal of a bit density lower than the bit density of said first bit signal, thermal head means having a plurality of heating elements for transferring dots of ink of an ink medium onto a sheet medium, and means for driving said heating elements according to said first bit signal and driving at least every other one of said heating elements according to said second bit signal.

4. The image forming apparatus according to claim 3, wherein said converting means includes a first decoder for producing said first bit signal and a second decoder for producing said second bit signal, and said driving means includes a plurality of switching elements connected in series to said respective heating elements and means for leading the outputs of said first decoder to control terminals of said switching elements, respectively and leading the outputs of said second decoder to at least every other ones of the control terminal of said switching elements.

5. The image forming apparatus according to claim 1, wherein said producing means comprises means for converting the document information and type face pattern data into bit signals, laser means which is driven by bit signals from the converting means to intermittently produce laser beam corresponding to the bit signals, means for deflecting the laser beams, and means for deflecting laser beams corresponding to the document information at one scanning speed and laser beams corresponding to the items of type face pattern data at another scanning speed.

6. The image forming apparatus according to claim 1, wherein said reproducing means includes means for converting document image information into a first bit signal of a predetermined bit density and converting said pattern data into a second bit signal of a bit density lower than the bit density of said first bit signal, wire printer means having a plurality of wire elements for transferring dots of ink from an ink medium onto a sheet medium, and means for driving said wire elements according to said first bit signal and at least every other ones of said wire elements according to said second bit signal.

7. The image forming apparatus according to claim 1, wherein said reproducing means includes means for converting document image information and pattern data into bit signals; CRT means driven in response to said bit signals of said converting means, to produce an electron beam modulated according to said bit signals; and means for deflecting said electron beam at different speeds with respect to said document image information and pattern data.

* * * * *